March 5, 1963  E. F. FARRELL  3,079,756
HYDRAULIC TORQUE CONVERTER
Filed Dec. 27, 1956  5 Sheets-Sheet 1
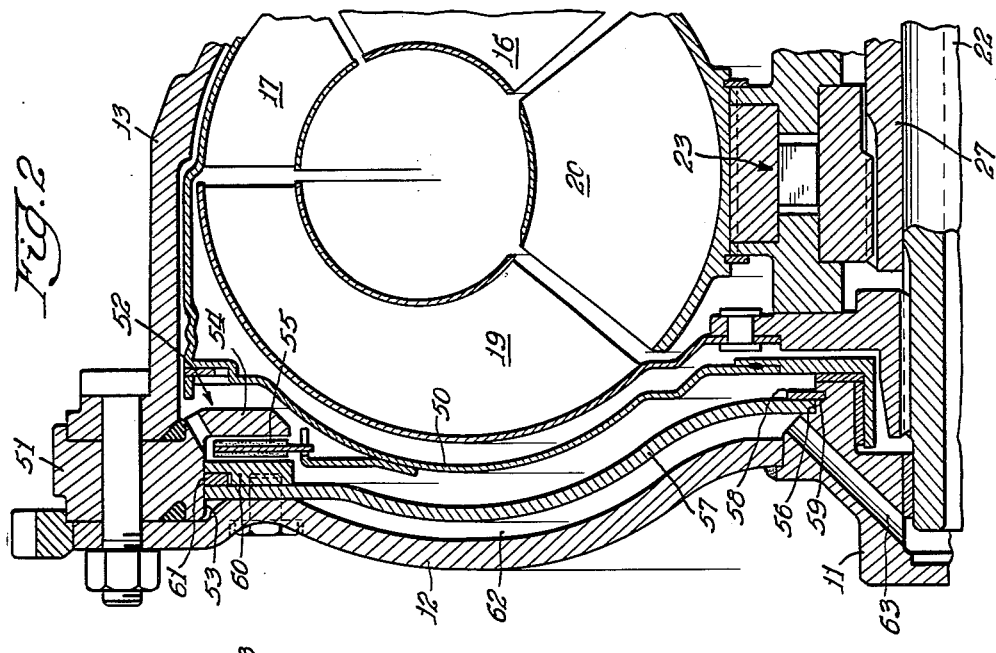
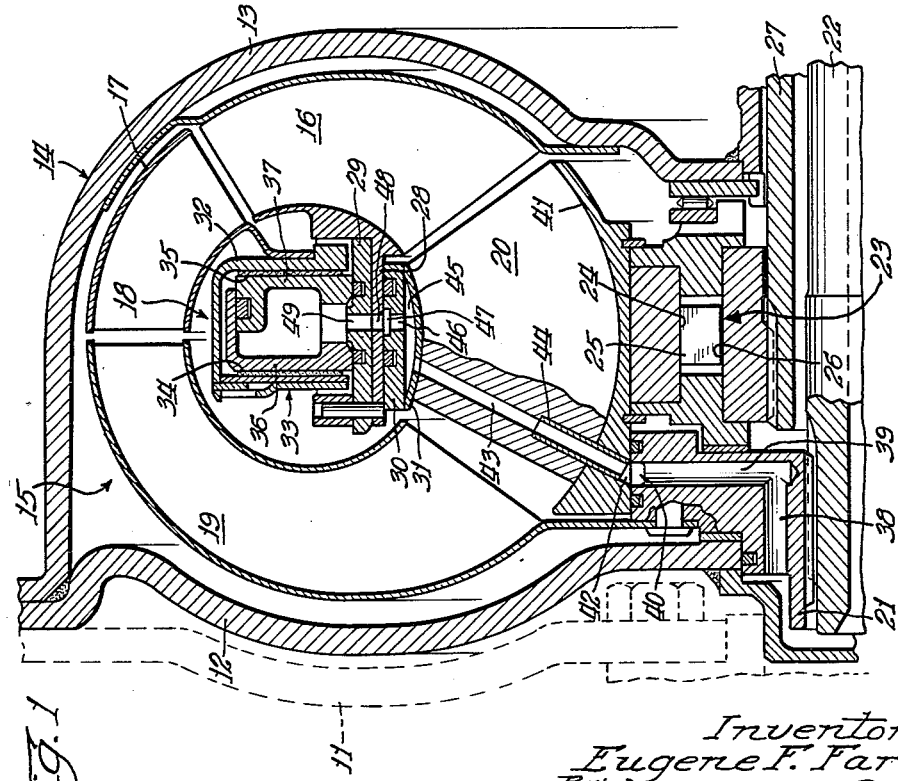
Inventor:
Eugene F. Farrell
By: Frank C. Parker
Atty.

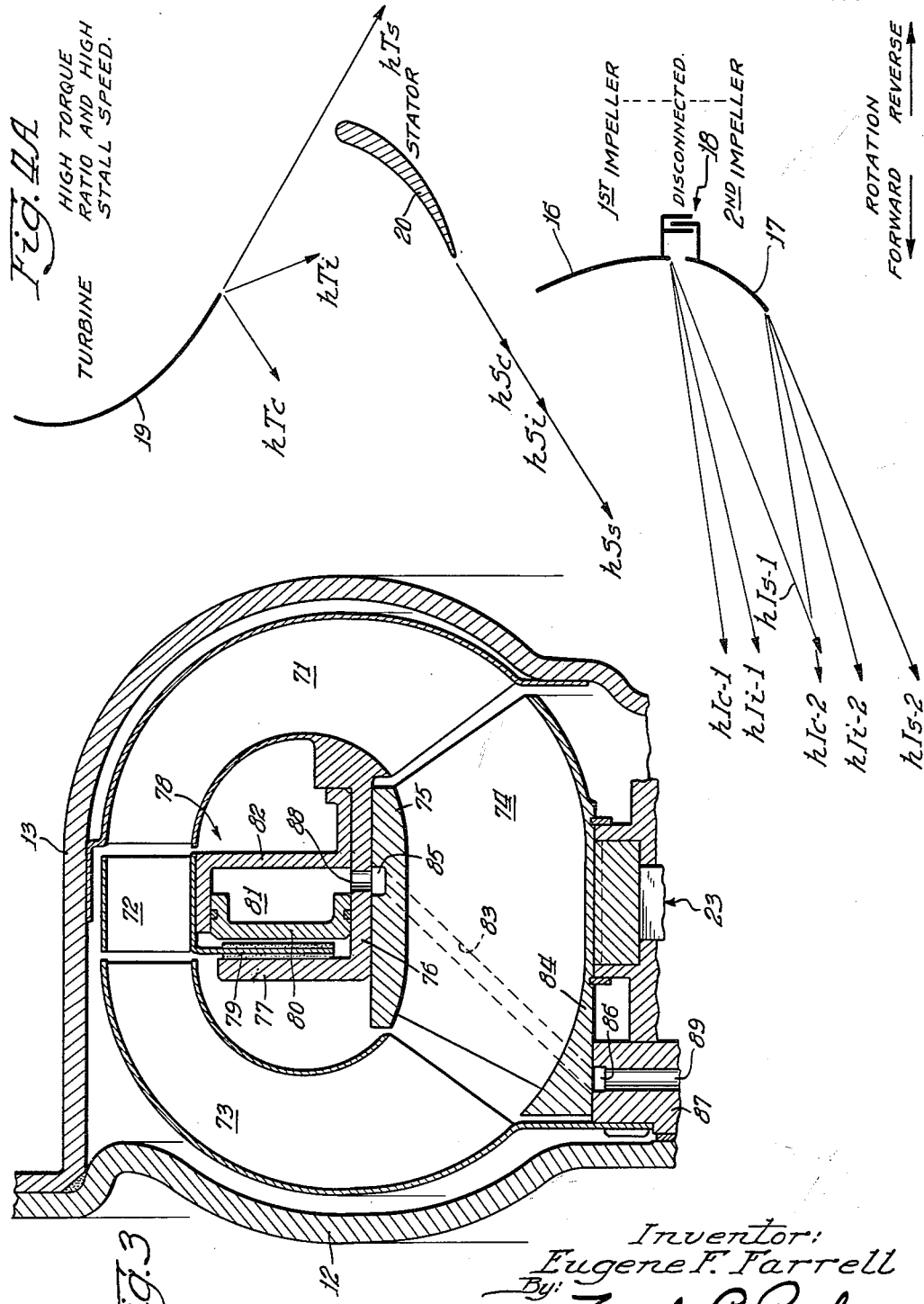

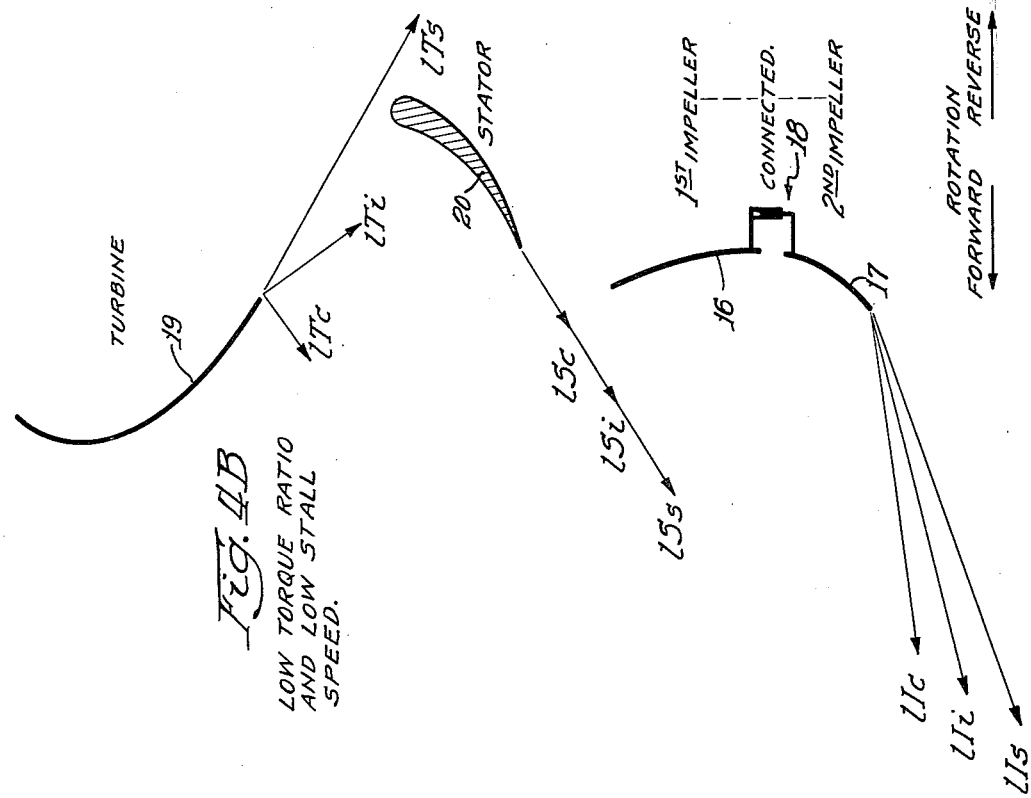
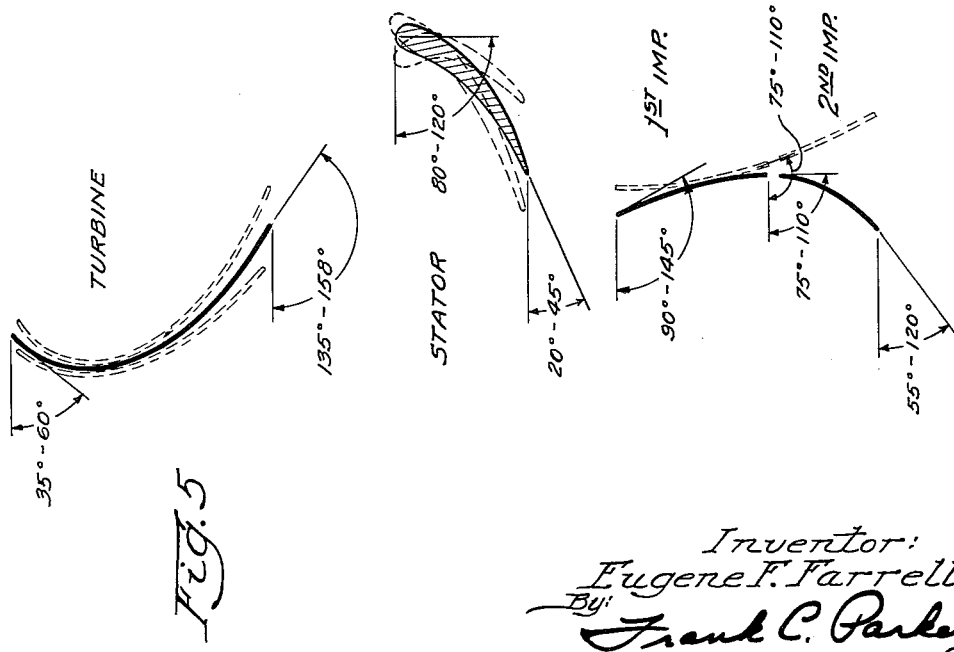

March 5, 1963

E. F. FARRELL 3,079,756

HYDRAULIC TORQUE CONVERTER

Filed Dec. 27, 1956

Inventor:
Eugene F. Farrell
By: Frank C. Parker
Atty

March 5, 1963 E. F. FARRELL 3,079,756
HYDRAULIC TORQUE CONVERTER
Filed Dec. 27, 1956 5 Sheets-Sheet 5
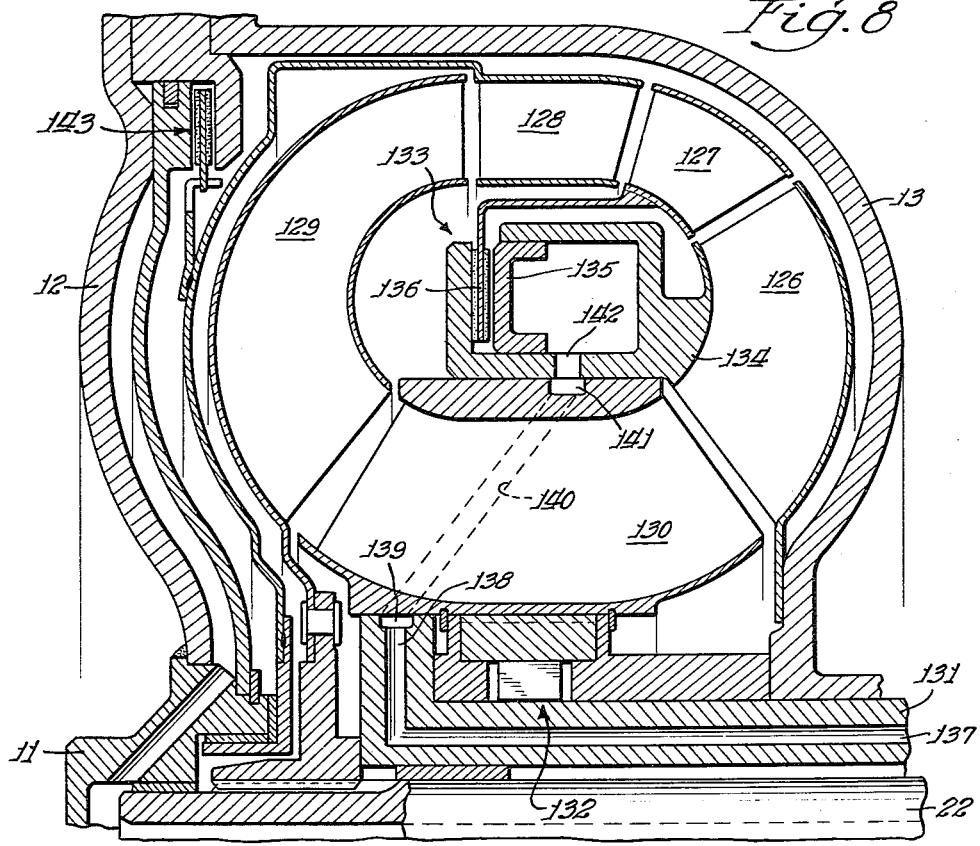
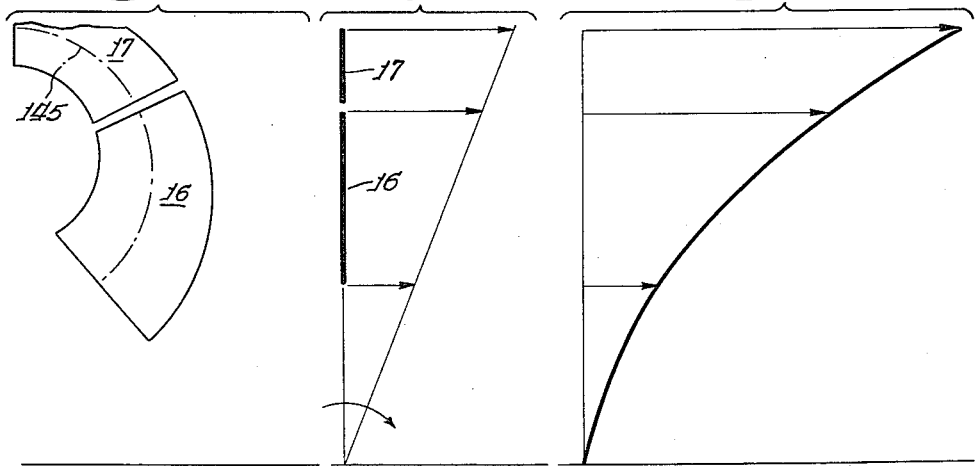
Inventor:
Eugene F. Farrell
By: Frank C. Parker
Atty United States Patent Office 3,079,756
Patented Mar. 5, 1963

3,079,756
HYDRAULIC TORQUE CONVERTER
Eugene F. Farrell, Grosse Pointe, Mich., assignor to Borg-Warner Corporation, Chicago, Ill., a corporation of Illinois
Filed Dec. 27, 1956, Ser. No. 630,873
2 Claims. (Cl. 60—54)

The present invention relates to transmission devices and more particularly to hydraulic torque converters suitable for use in transmissions for automotive vehicles.

The principal object of the present invention is to provide an improved hydraulic torque converter of the type comprising a plurality of relatively rotatable vaned elements which together define a substantially toroidal fluid circuit and which include vaned impeller means for imparting kinetic energy to the fluid in the toroidal circuit, vaned turbine means for absorbing energy from the circulating fluid, and vaned stator or reaction means for redirecting the fluid from a relatively reverse direction upon leaving the turbine means to a relatively more forward direction prior to entering the impeller means.

A more particular object of the present invention is to provide a hydraulic torque converter of the general type mentioned in the immediately preceding paragraph and including means selectively controllable for causing the torque converter to provide infinitely variable torque multiplication at a relatively high torque ratio or infinitely variable torque multiplication at a relatively low torque ratio.

More specifically, it is an object of the present invention to provide a hydraulic torque converter wherein the impeller means comprises a plurality of relatively rotatable vaned impellers which are selectively connectable together in order to enable the impeller means to impart different momenta to the toroidally circulating fluid and thereby selectively establish either the relatively low torque ratio range of operation or the relatively high torque ratio range of operation.

With the improved torque converter, as disclosed herein, it is possible to increase the efficiency and torque ratio at relatively low turbine-to-impeller speed ratios during the high torque ratio range of operation and to increase the efficiency of operation and torque ratio of the converter at relatively high turbine-to-impeller speed ratios during the low torque ratio range of operation, so that the overall performance of the converter is more suited for use in automotive vehicles.

It is contemplated that to obtain the desirable results, as disclosed herein, the auxiliary impeller members can be disposed either at a greater radius than the primary impeller member or at substantially the same radius as the secondary impeller member. It will be understood that the momentum imparted to the fluid by the converter impeller means is proportional to the square of the radius of the impeller exit so that by disposing the secondary impeller means at a greater radius than the primary impeller means, substantial differences in the mode of operation of the converter can be obtained under the different operating conditions. When the secondary or auxiliary impeller elements are disposed at substantially the same radius as the fluid exit for the primary impeller means, it is necessary to provide different exit angles to the vanes of the different impeller elements in order to impart the different momenta to the fluid.

It is contemplated that the control mechanism for interconnecting the secondary or auxiliary impeller elements with the primary impeller element will consist of fluid pressure actuated clutches which may be disposed either within the torus defined by the torque converter vaned elements or outside of the torus defined by the vaned elements. Furthermore, in order to illustrate how these clutches could be controlled, the present disclosure shows control means responsive to accelerator pedal depression as well as responsive to vehicle speed and it is also contemplated that the control means could be entirely manually selectable.

The present invention provides an improved hydraulic torque converter which is simple in design, and utilizes a minimum of different vaned elements but will provide the infinitely variable relatively high torque ratio which will be available for fast acceleration or the relatively low torque ratio range of operation which will be available for normal vehicle acceleration. The foregoing and numerous other objects and advantages of the present invention will become apparent from the following detailed description thereof when taken in conjunction with the accompanying drawings, wherein:

FIG. 1 comprises a fragmentary sectional view illustrating the principal features of a preferred embodiment of the present invention with the control clutch disposed within the converter torus;

FIG. 2 is a view similar to FIG. 1 and illustrating the principal features of a modified form of the invention where the control clutch is disposed outside of the converter torus;

FIG. 3 is a simplified view similar to FIGS. 1 and 2 and illustrating a second modification of the invention wherein the auxiliary impeller means have the same entrance and exit radii as the exit radius of the primary impeller vanes;

Figure 6:
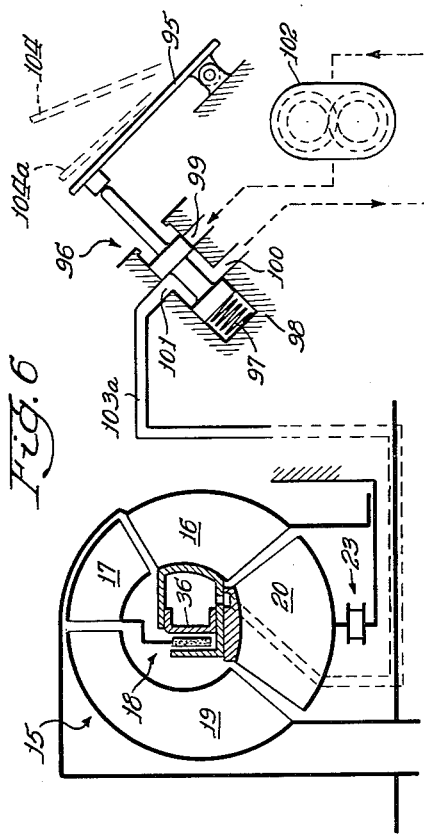
Figure 7:
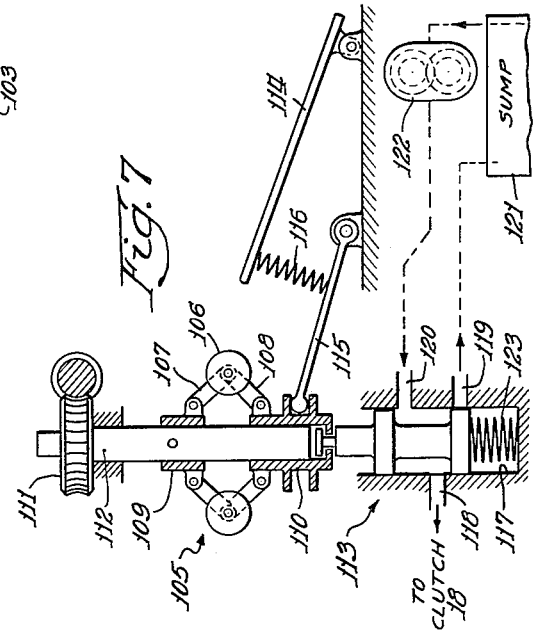

FIGS. 4A and 4B respectively comprise schematic diagrams illustrating vectorially the momentum of the fluid leaving the different torque converter vaned elements respectively during the high torque ratio and high stall speed range of operation and the low torque ratio and low stall speed range of operation;

FIG. 5 is a schematic diagram of the converter element blades showing the range of entrance and exit angles which it is contemplated may be used in torque converters such as are disclosed herein;

FIG. 6 is a schematic diagram illustrating one control arrangement for the clutch interconnecting the different impeller elements and comprising a valve mechanism under the control of an automotive vehicle accelerator pedal in order to enable selective operation of the torque converter in accordance with the degree of accelerator pedal depression;

FIG. 7 is a schematic diagram illustrating a second control means and incorporating speed responsive means for enabling differential control of the clutch in accordance with vehicle speed and the depression of the vehicle accelerator pedal;

FIG. 8 is a view similar to FIGS. 1, 2 and 3 and illustrating a still further modification of the invention comprising impeller means consisting of more than two vaned impeller elements;

FIGS. 9A, B and C, illustrate the effect on the momentum imparted to the fluid by impeller elements having different exit radii. FIG. 9A comprises a cross sectional view of a typical torque converter impeller comprising two parts, FIG. 9B shows the tangential velocity of the fluid imparted by the impeller vanes shown in FIG. 9A, and FIG. 9C shows the moment of momentum of a unit mass of fluid at various radii; and FIG. 10 comprises a graph showing the performance of a hydraulic torque converter as disclosed in FIG. 1 or 2 while operating in either the high torque ratio or low torque ratio range of operation.

Like reference numerals in the different views have been used to identify identical parts.

With reference now to the drawings and with particular reference to FIG. 1, the hydraulic torque converter shown therein will now be described. A disc-like member 11 is adapted to be driven directly by the vehicle engine crankshaft and a pair of annular members 12 and 13 respectively connected with member 11 define a housing 14 for the torque converter. The torque converter is represented generally by reference numeral 15 and comprises a primary vaned impeller element 16 directly connected with annular member 13, a secondary vaned impeller element 17 rotatably mounted with respect to primary impeller element 16 but adapted to be connected thereto by means of a friction clutch 18, a vaned turbine element 19 and a vaned stator or reaction element 20.

The vaned turbine element 19 is suitably connected with an annular hub 21 and the latter is splined to an output shaft 22. The stator 20 is mounted over a one-way engaging device 23 which includes an outer race 24 fixed to the stator 20, a plurality of wedging elements 25 and an inner race 26 splined on a quill shaft 27 fixed to a stationary part of the transmission casing. The one-way engaging device 23 functions to permit the stator 20 to rotate forwardly, that is, in the same direction as the direction of rotation of the other torque converter elements, but prevents reverse rotation of the stator and thereby is effective to cause the fluid leaving the turbine element 19 to be deflected in a more forwardly direction prior to its re-entry into the impeller element 16. The stator 20 performs this function all the time that the torque converter 15 multiplies torque and as soon as the fluid leaving the turbine 19 has a sufficiently forward component to urge the stator 20 forwardly, the one-way engaging device 23 overruns and allows the stator to free-wheel.

The clutch 18, as stated heretofore, is provided for interconnecting the primary impeller 16 with the secondary impeller 17 and this clutch is disposed within the torus defined by the torque converter elements 16, 17, 19 and 20. The clutch 18 comprises sleeve elements 28 and 29 connected for rotation with primary impeller element 16, the sleeve element 28 being rotatably mounted on a bearing element 30 fixed to the outer shell 31 of the stator 20. The clutch 18 also comprises an annular member 32 fixed to the secondary impeller element 17 and the annular member 32 carries a pressure plate mechanism 33 therewith. Disposed within the annular member 32 and the pressure plate mechanism 33 is a pair of friction discs 34 and 35 which respectively lie adjacent to piston members 36 and 37 so that when fluid under pressure is introduced between the piston members 36 and 37 they are urged axially to effect frictional engagement between the piston members and the annular member 32 and pressure member 33. The piston members, of course, are connected for rotation with sleeve member 29 so that when the clutch 18 is engaged, the primary impeller 16 and secondary impeller element 17 are drivingly interconnected for rotation together in unison.

Means are provided for introducing fluid under pressure into the annular cavity between piston members 36 and 37 and these means comprise fluid passageways leading from the interior of shaft 22. The hub 21 is formed with suitable openings 38 and 39 and with an interconnected annular groove 40. The inner shell member 41 of stator 20 is formed with at least one opening 42 disposed opposite the peripheral groove 40 formed in hub 41 in order to establish communication with the passageways 38 and 39. At least one of the stator vanes 20 is provided with at least one radially outwardly directed passageway 43 which is connected with the opening 42 by means of a short pipe section 44 which functions to interconnect openings 42 and 43. The opening 43 extends through the outer shell 31 and communicates with space 45 while the space 45 communicates with the space between the clutch pistons 36 and 37 through port 46 and groove 47 formed in bearing sleeve 30 and through ports 48 and 49 respectively formed in sleeve members 28 and 29.

The embodiment of the invention disclosed in FIG. 2 is substantially like the embodiment shown in FIG. 1 with the exception that the clutch for interconnecting the primary impeller element 16 with the secondary impeller element 17 is disposed outside of the torus defined by the torque converter elements in FIG. 2. Therefore, only the elements in FIG. 2 which are structurally different from those in FIG. 1 will be referred to with different identifying reference numerals.

In FIG. 2, the annular member 12 comprises one side of a fluid pressure chamber and disposed between the annular member 12 and the annular member 13 is a member 51 which forms part of a fluid pressure cylinder for energizing a friction clutch 52 located outside of the torus defined by the torque converter elements. The annular member 51 is provided with a substantially cylindrical surface 53 and a radially inwardly directed flange portion 54 which forms a pressure plate for the clutch 52. Disposed adjacent the pressure plate 54 is a friction disc 55 connected with an annular member 50 which, in turn, is connected with the secondary impeller element 17. The input member 11 is formed with an axially stationary cylindrical outwardly facing surface 56 and a resilient disc-like member 57 is snugly fitted around surface 56 and held thereon by means of a stop ring 58 seated within a suitable groove 59 formed in driving member 11. The resilient disc 57 extends radially outwardly and engages the inwardly facing cylindrical surface 53, the member 57 being formed with a pressure member 60 engageable with the friction disc 55 and with a sealing ring 61 disposed against the cylindrical surface 52 for substantially sealing the cavity 62 formed between disc members 12 and 57.

When fluid under pressure is admitted into cavity 62, the resilient disc member 57 is moved to the right to bring pressure member 60 against friction disc 55 and cause the disc to engage the pressure plate 54 and this has the effect of engaging the clutch 52 and thereby interconnecting the primary impeller element 16 and the secondary impeller element 17. Suitable means are provided for introducing fluid under pressure into the cavity 62 and these means comprise a fluid conduit 63 formed in driving member 11 which communicates with the interior of shaft 22 and with cavity 62.

It will be noted that in both embodiments of the invention shown in FIGS. 1 and 2, the shape and toroidal disposition of the impeller elements 16 and 17 are substantially the same, with the secondary element 17 being disposed radially outwardly with respect to the primary impeller element 16. As is well-known, rotation of the impeller means of a hydraulic torque converter is effective to impart momentum to the fluid circulating toroidally within the torque converter and the momentum thus supplied to the fluid is proportional to the square of the radius of the point of exit of the fluid from the impeller element. Therefore, in view of the fact that the exit for the secondary element 17 is disposed at a greater radius from the center of rotation of the impeller means than the fluid exit for the primary element 16, the momentum of the fluid being circulated toroidally within the torque converter 15, when the secondary impeller 17 is connected with the primary element 16 is greater than when the secondary element 17 is disconnected from the primary element 16, assuming the same speed of rotation in both cases. This would be true even though the exit angles for the vanes of both impeller elements 16 and 17 are substantially identical.

The same affect can be obtained by providing different exit angles for the secondary impeller vanes even though the fluid exit for the secondary impeller vanes is disposed at the same radius from the axis of rotation of the impeller as the fluid exit for the primary impeller element. The embodiment of the invention disclosed in FIG. 3 illustrates this axial form of the torque converter where the fluid exits for both impeller elements are disposed at substantially the same radius.

The form of the invention shown in FIG. 3 comprises what may be called the axial version of the torque converter comprising the present invention where the fluid exit from both impeller elements are at substantially the same radius from the axis of rotation of the torque converter. In FIG. 3, the torque converter is essentially like the torque converter shown in FIGS. 1 and 2 except that the primary impeller 71 extends radially outwardly further than the primary impeller 16 and the secondary impeller 72 is substantially cylindrical, that is, its entrance and exits are disposed at substantially the same radius from the axis of rotation of the torque converter as the exit for the primary impeller 71. The turbine 73 is substantially the same shape as the turbine 19, however, the stator 74 has a somewhat greater axial dimension than the stator 20.

The stator 74 is mounted over the one-way engaging device 23 and the outer shell 75 of the stator 74 comprises a bearing sleeve for rotatably mounting the projecting sleeve 76 integrally formed on the inner shell of primary impeller member 71. The projecting sleeve 76 has a radially outwardly extending flange 77 which forms a pressure plate for a clutch 78 provided for interconnecting primary impeller member 71 with secondary impeller member 72. The clutch 78 also includes a friction disc 79 connected with the secondary member 72 and a piston 80 reciprocable axially within a cylinder 81 defined by the outer periphery of sleeve 76 and the inner periphery of an axially extending portion of an annular member 82.

Means are provided for effecting engagement of friction clutch 78 and these means are substantially like the means disclosed in FIG. 1 for engaging clutch 18. In this regard, at least one of the stator vanes 74 is provided with a passageway 83 which extends through the inner shell 84 of the stator and establishes fluid communication between a peripheral groove 85 formed around the bearing sleeve 76 and a peripheral groove 86 formed in supporting hub element 87 for turbine 73. A series of apertures 88 formed in sleeve 76 establish communication between the peripheral groove 85 and the cylinder 81. Fluid under pressure therefore is supplied to passageway 89 and this fluid leaves the cylinder 81 through the aforementioned passages in order to effect movement of piston member 80 to cause it to engage friction disc 79 and thereby interconnect primary and secondary impeller elements 71 and 72.

The torque converters disclosed in FIGS. 1, 2 and 3 all function in substantially the same manner and with reference first to FIG. 4A, the mode of operation of these three torque converters will be described. Inasmuch as the operation of the vaned elements shown in FIG. 3 is substantially identical with the operation of the vaned elements shown in FIGS. 1 and 2, only the reference numerals corresponding to the vaned elements in FIGS. 1 and 2 have been utilized to designate the vaned elements in FIG. 4A.

Figure 10:
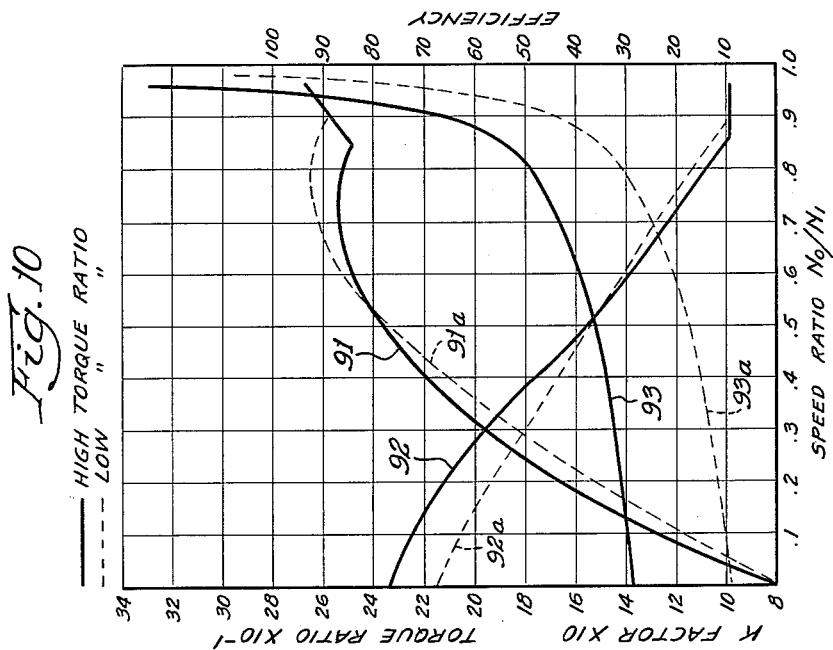

FIG. 4A discloses the vectors designating the momentum of the fluid leaving the different vaned torque converter elements under those conditions when the interconnecting clutch 18, 52 or 78 is disengaged. Under these conditions the torque converter will function to provide the high torque ratio range of infinitely variable torque conversion. Performance characteristics of this range of torque conversion are shown in FIG. 10 and are represented by the solid lines. In FIG. 4A the momentum vectors have been shown corresponding to stall conditions of operation, conditions of operation when the converter is no longer multiplying torque (clutch point) and at some point intermediate between stall and the clutch point.

Under the conditions of operation designated in FIG. 4A, the clutch 18 is disengaged, as stated heretofore, and the fluid leaves the secondary impeller vanes 17 in substantially the same direction and with substantially the same force as it leaves the primary impeller vanes inasmuch as the secondary impeller 17 is disconnected from the primary impeller and is therefore free to idle. There are some slight losses due to the secondary impeller 17 idling and therefore the vectors leading from the secondary impeller 17 are somewhat shorter than the vectors leaving from the exit of the primary impeller 16.

At stall, the turbine 19 is stationary, the stator is stationary and the first or primary impeller 16 comprises the input member. The fluid leaves the first impeller 16 with a momentum $hI_{s-1}$ and this fluid acts upon the secondary impeller 17. The secondary impeller 17 idles and the fluid leaves the secondary impeller 17 with a momentum $hI_{s-2}$ and enters the turbine 19. Inasmuch as the turbine 19 is stationary at stall the fluid leaves the turbine at an angle substantially equal to the exit angle of the turbine and the momentum of the fluid leaving the turbine under these conditions is designated by vector $hT_s$ and enters the stator 20. The stator functions to redirect the fluid from the reverse direction at which it enters the stator to a relatively more forward direction and the momentum of the fluid leaving the stator 20 during stall conditions is represented by vector $hS_s$.

When the turbine 19 commences to rotate forwardly, the fluid will have a greater forward component as it leaves the turbine and at some intermediate point between stall and the clutch point the fluid leaves the turbine with a momentum designated by vector $hT_i$. The fluid, during this intermediate turbine-to-impeller speed ratio, therefore leaves the stator with a momentum designated by vector $hS_i$ and re-enters the first impeller 16. At this same turbine-to-impeller speed ratio the fluid leaves the first and second impellers with momenta respectively designated by vectors $hI_{i-1}$ and $hI_{i-2}$.

At the clutch point, the fluid leaves the turbine in a still more forward direction, as designated by vector $hT_c$, and actually impinges against the reverse faces of the stator vanes 20, thereby causing the stator 20 to rotate forwardly, such rotation being permitted by the one-way engaging device 23. At the clutch point the fluid leaves the stator 20 with a momentum designated by vector $hS_c$ and re-enters the first impeller 16. The fluid leaves the first impeller 16 with a momentum $hI_{c-1}$ and leaves the secondary impeller 17 with a momentum $hI_{c-2}$.

With reference to FIG. 10, as stated heretofore, the solid curves represent the performance curves while the torque converter of FIGS. 1, 2 or 3 is functioning in its high torque ratio range of operation. The curve 91 designates the efficiency curve for the torque converter with the clutch disengaged whereas the curves 92 and 93 respectively correspond to the torque ratio and K factor curves under the same conditions of operation. It will be understood that the torque ratio curve 92 represents a plot of turbine-to-impeller torque ratio against turbine-to-impeller speed ratio, that the efficiency curve 91 represents the turbine-to-impeller torque ratio multiplied by the turbine-to-impeller speed ratio plotted against turbine-to-impeller speed ratio and the K factor curve represents a plot of the value of the quantity $$\left(\frac{\text{input speed}}{\sqrt{\text{input torque}}}\right)$$

against turbine-to-impeller speed ratio.

With reference to FIG. 4B, the conditions of operation when the clutch 18 is engaged will now be described. Under these conditions the primary impeller 16 and the secondary impeller 17 are interconnected and function substantially as integral vanes so that it is only necessary to consider the angular momentum of the fluid leaving the secondary impeller vanes 17. During the engagement of clutch 18, the torque converter provides infinitely variable torque multiplication over a relatively low torque ratio and low stall speed range of operation.

At stall with the clutch 18 engaged, the impeller vanes 16 and 17 impart momentum to the fluid, as designated by the vector 1I$s$ and, the turbine 19 being stationary at this time, the fluid leaves the turbine vanes 19 in a direction substantially equal to the exit angles of the turbine vanes and at a momentum represented by vector 1T$s$. The fluid leaving the turbine vanes thus impinges on stator vanes 20 and the latter function to reverse the direction of flow of the fluid and cause the fluid to leave the stator vanes with a momentum represented by vector 1S$s$.

At an intermediate turbine-to-impeller speed ratio somewhere between stall and the clutch point, the impeller vanes 16 and 17 impart a momentum to the fluid designated by vector 1I$i$ and under these conditions the turbine 19 rotates forwardly at some speed ratio with respect to the movement of the impeller vanes and the fluid leaves the turbine vanes under these conditions with a momentum represented by vector 1T$i$. The fluid still impinges on the forward faces of the stator vanes 20 and leaves the stator vanes 20 with a momentum designated by vector 1S$i$. When the torque converter no longer multiplies torque, that is, when the clutch point is reached, the fluid leaves the impeller vanes with a momentum designated by vector 1I$c$ and leaves the turbine vanes with a momentum designated by vector 1T$c$. Under these conditions the fluid impinges against the reverse faces of the stator vanes 20 and causes the stator to rotate forwardly, the fluid leaving the stator vanes with an angular momentum represented by vector 1S$c$.

The dashed lines in FIG. 10 comprise the performance characteristics of the FIG. 1 converter with the clutch engaged, the efficiency curve being represented by line 91$a$, torque ratio by line 92$a$, and K factor by curve 93$a$.

FIG. 5 shows schematically the turbine, stator, and impeller vanes, and the angular variation for the entrances and exists of the vanes represents the range of angles which it is believed could be used in constructing a torque converter in accordance with the principles of the present invention. The angles shown are measured from the tangent to the mean flow line to the tangent to the blade at the same point for the respective entrances and exits for each of the blades.

It is contemplated that the control clutches shown in each of the embodiments may be controlled in any desired manner. FIGS. 6 and 7 merely illustrate two methods of controlling these clutches.

With reference first to FIG. 6, means are provided for causing engagement and disengagement of the control clutch 18 in accordance with depression of an accelerator pedal 95 such as is conventionally employed for controlling the fuel supply of an automotive vehicle engine. In FIG. 6 a reciprocable valve 96 is disclosed as being normally biased upwardly by compression spring 97 and movable downwardly in response to depression of the accelerator pedal 95 below a predetermined position. The valve 96 is reciprocable within a valve block 98 and suitable ports 99, 100 and 101 respectively communicate with an oil pressure pump 102, an oil sump 103 and with a fluid passageway 103$a$ leading to the actuating piston 36, for clutch 18. Under normal conditions of operation, with the accelerator pedal 95 disposed between its relaxed position, as designated by reference numeral 104, and a predetermined depressed position, as designated by reference numeral 104$a$, the valve 96 will be in a position to establish fluid communication between ports 99 and 101. Fluid pressure is therefore supplied by the pump 102 to effect engagement of the clutch 18 and thereby cause the torque converter 15 to function in its low torque ratio and low stall speed range of operation. Whenever it is desired to obtain more rapid acceleration of the automotive vehicle it is normal for the operator of the vehicle to depress the accelerator pedal 95 further and such depression causes the accelerator pedal to engage the valve 96 and establish fluid communication between the ports 100 and 101. This has the effect of draining the actuating motor for the clutch 18 and establishing the high torque ratio and high stall speed range of operation of the converter.

In FIG. 7, an alternative form of controlling the clutch, which is somewhat more automatic, is disclosed. In this form, control of the clutch is not only effected in response to accelerator pedal depression but also is controlled by a governor 105 which, in turn, is responsive to the speed of the automotive vehicle. In this regard the governor 105 comprises a plurality of centrifugal weights 106 which are interconnected by means of a pair of levers 107 and 108, in the form of a toggle arrangement. The levers 107 and 108 are respectively connected with an axially stationary sleeve 109 and with an axially reciprocable sleeve 110. Worm gearing 111 responsive to the speed of rotation of the vehicle drives a shaft 112 which is connected to sleeve 109 and thus as the shaft 112 increases its rotational speed the weights 106 fly outwardly further and tend to raise a valve 113. An accelerator pedal 114 is connected through a compression spring 116 with a lever 115 which also acts upon sleeve 110 so that relaxation of the accelerator spring 114 also has the effect of raising the valve 113 and depression of the accelerator 114 tends to cause the valve to be lowered.

The valve 113 is mounted within a bore 117 formed in a suitable valve block and the bore 117 communicates with suitable ports 118, 119 and 120 which respectively communicate with the clutch actuating motor, a fluid sump 121 and a fluid pressure pump 122. When the accelerator pedal 114 is relaxed or the governor 105 is rotating at a relatively high speed, a spring 123 tends to raise valve 113 to establish communication between ports 120 and 118 to engage clutch 18 to cause establishment of the low torque ratio range of operation. If the governor weights slow down sufficiently or if the accelerator pedal 114 is depressed sufficiently, the valve 113 is depressed against spring 123 to cause communication between ports 118 and 119 to thereby drain the clutch actuating motor. This causes disengagement of the clutch 18 and establishment of the high torque ratio range of operation.

FIG. 8 discloses a further embodiment of the invention comprising impeller means consisting of more than two vaned elements and with the arrangement shown in FIG. 8, it is possible to obtain three different torque ratio ranges of operation of the torque converter. In FIG. 8, the drive member 11 is connected with annular members 12 and 13, the latter being connected with a primary impeller element 126. The torque converter shown in FIG. 8 also includes a first set of secondary impeller elements 127 and a second set of impeller elements 128, a turbine 129 connected with output shaft 22 and a stator 130 connected with a stationary sleeve shaft 131 through the intermediary of a one-way engaging device 132. A friction clutch 133 is provided within the torus defined by the torque converter elements for interconnecting the primary impeller element 126 with the secondary impeller element 127. The clutch 133 comprises a first member 134 which forms a cylinder for a reciprocable piston 135. The clutch 133 also includes a friction disc 136 secured to the secondary impeller element 127. Fluid passages connecting a source of fluid pressure with the clutch cylinder comprise an axially extending opening 137 in shaft 131, a radially extending opening 138 in a collar portion of shaft 131, a peripheral groove 139 disposed around the collar at the end of shaft 13, radially outwardly extending passages 140 formed in at least one of the stator vanes 130, the latter communicating with a peripheral groove 141 formed in the outer shell of stator 130. The groove 141 communicates with the clutch actuating cylinder through a plurality of ports 142 formed in member 134.

A clutch 143 is provided for interconnecting the second secondary impeller element 128 with the primary impeller element 126 and this clutch is substantially identical with the clutch 52 shown in FIG. 2 and includes a fluid communication passageway 144 formed in driving member 11.

It will be understood that the clutches 133 and 143 may be controlled in any desired manner in order to effect establishment of the ranges of torque conversion provided by the converter in FIG. 8.

FIGS. 9A, 9B and 9C disclose the effect upon the momentum of the fluid leaving the impeller vanes and due to the provision of different exit radii for the different impeller elements. FIG. 9A, as stated, merely discloses in cross section the impeller elements 16 and 17 and the dashed line 145 designates the mean flow line of the fluid passing through the impeller elements 16 and 17. FIG. 9B discloses horizontal vectors representing the tangential velocity of the fluid at different radii from the axis of rotation and corresponding to the radii of the mean flow line at the entrance and exit of primary impeller element 16 and at the exit of secondary impeller element 17. FIG. 9C discloses vectors representing the moment of momentum of a unit mass of fluid at the various radii corresponding with the mean flow line at the entrance and exit of primary impeller element 16 and at the exit of the secondary impeller element 17. From these figures it is apparent that a slight change in radius between the exits of the different impeller elements has a substantial effect on the energy capable of being imparted to the fluid and therefore it is possible to provide a torque converter capable of affording multiple ranges of torque multiplication with rather small changes in the exit radii for the different impeller elements.

It is contemplated that numerous changes and modifications may be made in the present invention without departing from the spirit or scope thereof.

What is claimed is:

1. In combination, a drive member, a driven member, a hydraulic torque converter comprising a plurality of relatively rotatable vaned elements together defining a substantially toroidal fluid circuit, a plurality of said vaned elements comprising impeller means for changing the angular momentum of the fluid leaving the impeller means to thereby impart kinetic energy to the fluid and one of the impeller elements being directly connected for rotation in unison with said drive member, another of said vaned elements comprising turbine means connected with said driven member and adapted for absorbing kinetic energy from the fluid in order to drive the driven member, still another of said vaned elements comprising stator means for changing the direction of flow of the fluid prior to its re-entry into the impeller means for enabling the multiplication of torque by the converter, the remainder of said impeller elements being rotatably mounted with respect to said one impeller element and the angles and toroidal disposition of the exits of the vanes of the different impeller elements being different, said remainder of impeller elements being adapted to idle and exert substantially no effect on the fluid, manually operated friction clutch means disposed within the torus defined by said vaned elements for selectively connecting the remainder of said impeller elements with the one which is directly connected with said drive member for changing the effective fluid exit of said impeller means to thereby provide multiple selectively operable torque conversion ranges, fluid pressure actuated piston means for effecting engagement of said clutch means, a source of fluid pressure, and means defining a fluid pressure conduit extending generally radially through at least one vane of one of said vaned elements for establishing fluid communication between said source and said fluid pressure actuated means.

2. The combination, as defined in claim 1, wherein said fluid pressure conduit extends generally radially through at least one of the vanes of the stator element.

References Cited in the file of this patent

UNITED STATES PATENTS

| | | |
|---|---|---|
| 2,116,461 | Fottinger | May 3, 1938 |
| 2,117,673 | Lysholm | May 17, 1938 |
| 2,120,896 | Koeppen et al. | June 14, 1938 |
| 2,298,649 | Russell | Oct. 13, 1942 |
| 2,302,714 | Pollard | Nov. 24, 1942 |
| 2,603,943 | Everndon | July 22, 1952 |
| 2,616,310 | Jandasek | Nov. 4, 1952 |
| 2,710,504 | Dodge | June 14, 1955 |

FOREIGN PATENTS

| | | |
|---|---|---|
| 420,252 | Great Britain | Nov. 28, 1934 |
| 439,628 | Great Britain | Dec. 6, 1935 |